Sept. 30, 1930.  H. HENDERSON  1,776,974
LIQUID COOLED STUFFING BOX
Filed Aug. 25, 1926
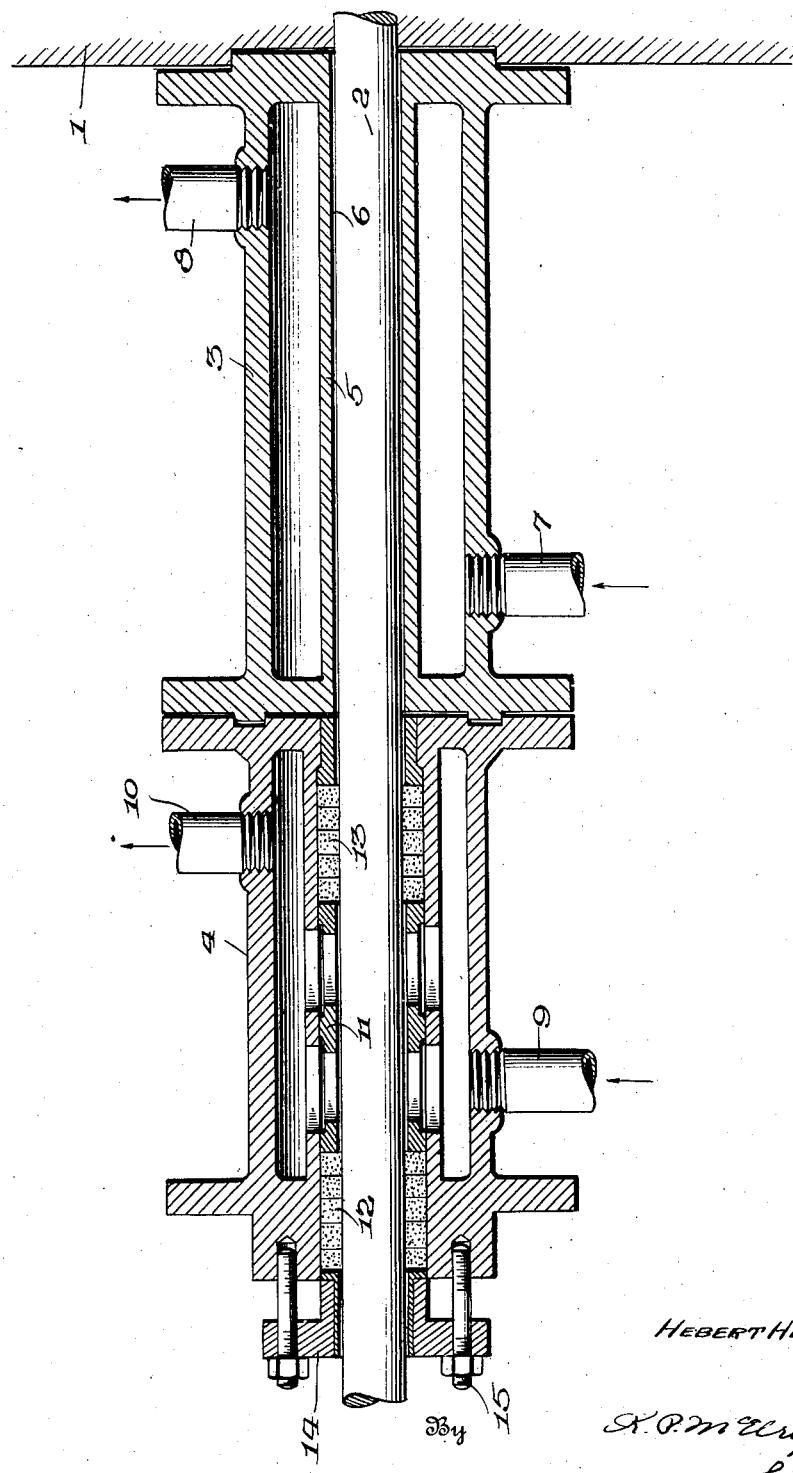
Inventor
HEBERT HENDERSON Patented Sept. 30, 1930

1,776,974

UNITED STATES PATENT OFFICE

HERBERT HENDERSON, OF PORT ARTHUR, TEXAS, ASSIGNOR TO GULF REFINING COMPANY, OF PITTSBURGH, PENNSYLVANIA, A CORPORATION OF TEXAS

LIQUID-COOLED STUFFING BOX

Application filed August 25, 1926. Serial No. 131,483.

This invention relates to liquid cooled stuffing boxes and more particularly to a stuffing box for hot oil pumps, and it comprises, in combination with a pump cylinder and reciprocating pump shaft, a cooling jacket of a length substantially equal to that of a pump stroke through which said reciprocating shaft loosely extends, and through which a cooling liquid is adapted to be circulated without coming in contact with the shaft, whereby the shaft is cooled, and oil from inside the pump chamber which adheres to it is likewise cooled to thereby eliminate the possibility of corrosion and to promote lubrication of the shaft; and a stuffing box mounted on said shaft in alignment with the said cooling jacket, comprising a casing through which cold oil is adapted to be circulated in contact with said shaft, packing mounted in said stuffing box, and means for retaining the packing in position; all as more fully hereinafter set forth and as claimed.

Pumping mechanism which is adapted to circulate highly heated oil is subject to stuffing box leaks and corrosion. Hot oil which adheres to the reciprocating pump shaft and is carried outside the pump chamber by it has a corrosive effect on the metal of the pump shaft, and the heat of the oil circulated, moreover, varies the cross-sectional shape and diameter of the pump shaft thereby distorting it and quickly destroying the packing of the stuffing box by undue wear and imperfect fit. In order to insure against leakage of a stuffing box it is essential that a tight and accurate fit be maintained at all times between the packing and shaft. By providing a means for initially cooling the shaft before its entrance into the stuffing box that portion of it which reciprocates within the stuffing box is maintained at a relatively low temperature with but little expansion and contraction which would vary its diameter, and consequently a tight and leak-proof joint may be provided which requires infrequent attention and repacking only after long usage.

It is accordingly an object of my invention to provide a stuffing box assembly for hot oil pumps and the like which comprises a means for initially cooling the shaft and also means for preventing leakage of liquid therealong.

Other and further objects will be apparent from the following description and drawing in which the single figure is a cross-sectional view through the stuffing box assembly comprising the present invention, showing a section of shaft mounted therein.

Referring to the drawing:

A pump cylinder 1 has a shaft 2 extending through its wall and surrounded by aligned units 3 and 4. The unit 3 is a cooling jacket of a length equal, or substantially equal, to the length of a pump stroke. It is formed with an interior wall 5 which surrounds the shaft loosely and defines a space 6 therebetween. An inlet 7 and outlet 8 communicate with the interior of the cooling jacket for the circulation of a cooling liquid therethrough, such as cold oil. Mounted upon the shaft and in alignment with the unit 3 is a stuffing box unit 4 which comprises a casing adapted to receive and circulate oil about and in contact with the shaft, an inlet 9 and outlet 10 being provided for this purpose. A spacing member 11 of skeleton formation, to permit the oil to easily reach the shaft, retains packing as indicated at 12 and 13 in each end of the stuffing box and in contact with the shaft. Adjustment of the packing can be made, if desired, by a gland 14 fitted in the end of the stuffing box and adjustably secured thereto by bolts 15. Tightening of the bolts moves the gland inwardly against the packing, thereby compressing it and moving the spacing member 11 to compress the packing at the opposite end of the stuffing box.

In operation, that part of the shaft which enters the pump chamber and comes in contact with the hot oil therein upon outward reciprocation travels through the cooling jacket which absorbs most of its heat and at the same time cools the hot oil which is withdrawn from the pump chamber on the surface of the shaft. That portion of the shaft which reciprocates within the stuffing box unit is further cooled by the cold oil which is in contact with it. Its true circular configuration in cross-section is, thus, preserved and an accurate fit obtained with the packing at each end of the box. Thus, no oil can leak along the reciprocating shaft beyond the stuffing box, and because of the fact that there is little or no expansion and contraction in this portion of the shaft the packings are not quickly worn, but will retain their liquid sealing properties for long periods of time.

From the foregoing it will be apparent that I have provided a simple and efficient stuffing box assembly for reciprocating shafts which permits of cooling and properly lubricating such shafts, eliminating corrosion and promoting liquid sealing properties.

What I claim is:

1. The combination with a reciprocating pump rod of a jacket surrounding said rod and slightly spaced therefrom, said jacket having a length substantially equal to that of a pump stroke, means for circulating a cooling liquid through said jacket out of contact with the rod; a stuffing box mounted circumferentially of the rod in longitudinal alignment with said jacket, packing at each end of said stuffing box in contact with the pump rod, spacing means for retaining said packing in position, and means for circulating cooling liquid through said stuffing box and in contact with said pump rod to further cool and lubricate it.

2. The combination with a reciprocating pump rod of a cooling jacket surrounding said rod, said jacket having a length substantially equal to that of a pump stroke, means for circulating cooling liquid through said jacket, a stuffing box mounted circumferentially of the rod in alignment with the jacket, packing in the stuffing box contacting with the pump rod, and a second means for circulating cooling liquid through the stuffing box in contact with the pump rod to cool and lubricate it.

3. A packing and cooling assembly for pump rods comprising a pump cylinder, a pump rod adapted to reciprocate within the cylinder, a cooling chamber disposed circumferentially of the rod and externally of the cylinder, said chamber being formed with an inner continuous annular wall slightly spaced from the pump rod to provide a cooling chamber around the pump rod, and out of direct contact therewith, said chamber having a length not substantially less than the length of stroke of the pump rod, a packing chamber disposed circumferentially of the pump rod and in alignment with the cooling chamber, said packing chamber being formed with an inner perforate wall spaced from the rod, packing disposed between the inner wall and the rod at each end of the chamber, means for spacing and positioning the packing, means for introducing cooling fluid to the cooling chamber and means for introducing fluid to the packing chamber to lubricate the rod and to prevent leakage through the packing.

In testimony whereof, I have hereunto affixed my signature.

HERBERT HENDERSON.